United States Patent [19]

Kaun

[11] Patent Number: 5,736,275

[45] Date of Patent: Apr. 7, 1998

[54] HIGH POWER BIPOLAR BATTERY/CELLS WITH ENHANCED OVERCHARGE TOLERANCE

[75] Inventor: Thomas D. Kaun, New Lenox, Ill.

[73] Assignee: The University of Chicago, Chicago, Ill.

[21] Appl. No.: 641,331

[22] Filed: Apr. 30, 1996

[51] Int. Cl.[6] ............................ H01L 4/58; H01L 10/18
[52] U.S. Cl. ........................... 429/199; 429/218; 429/210
[58] Field of Search ........................ 429/199, 218, 429/210

[56] References Cited

U.S. PATENT DOCUMENTS 3,615,828  10/1971  Fischer .
4,764,437  8/1988   Kaun .
4,851,306  7/1989   Kaun et al. .
5,162,172  11/1992  Kaun .
5,194,298  3/1993   Kaun .
5,455,206  10/1995  Kaun .

OTHER PUBLICATIONS

"A Shuttle Mechanism for Molten–Electrolyte Lithium Batteries," Kaun, et al., Electrochemical Society Meeting, October 11–15, 1993, New Orleans, LA.

Primary Examiner—John S. Maples
Attorney, Agent, or Firm—Michael D. Rechtin; Foley & Lardner

[57] ABSTRACT

A cell or battery of cells having improved overcharge tolerance and increased power capability, and methods for the construction of such cells or batteries, via electrolyte modification.

24 Claims, 3 Drawing Sheets

HIGH POWER BIPOLAR BATTERY/CELLS WITH ENHANCED OVERCHARGE TOLERANCE

CONTRACTUAL ORIGIN OF THE INVENTION

The invention described herein was made in the course of Contract No. W-31-109-ENG-38 with the U.S. Department of Energy and Argonne National Laboratories.

BACKGROUND OF THE INVENTION

The present invention relates to lithium alloy batteries, and particularly to batteries having cells with electrodes formed of Li alloy/FeS or Li alloy/FeS$_2$, having a high degree of overcharge tolerance and increased power capability.

Conventional high-temperature bipolar batteries have positive and negative electrodes which are confined relative to the collectors of positive and negative current. The current collectors are electrically insulated from one another by a separator. An electrolyte is present and infused throughout (into) the electrodes and the separator. The positive and negative current collectors are commonly formed of electrically conductive sheets which also confine the electrode materials. When arranged in a series configuration, a bipolar plate caps the negative electrode, as well as attaches the positive compartment of the next cell in the bipolar stack. Full size batteries of this type are comprised of many cells grouped together in an end-to-end or face-to-face arrangement in a common battery housing and are electrically connected in series to produce higher effective voltage output. Typically, the negative electrode material is a lithium alloy, such as LiSi or LiAl and the positive electrode material is an iron sulfide, such as FeS or FeS$_2$.

Overcharge tolerance is desirable in lithium batteries, especially batteries having multiple cells, because it is usual for individual ones of a plurality of cells to have a different state of charge at a given time. Thus, when an effort is made to recharge the battery from a discharged condition, some of the cells reach their fully charged state before the other cells do. A continuation of charging beyond this point has the undesirable effect of overcharging the fully charged cells, which results in permanent damage to the battery (i.e., excessive positive electrode or current collector oxidation with resulting deposition of metal particles to bridge the electrodes). Alternatively, if the charging operation is stopped when only one of the cells is fully charged, then the overall potential capacity of the battery is not realized, because all but one of the cells of the battery are only partially charged.

The search for an effective route means, mechanism or method for achieving overcharge tolerance has been an ongoing concern in the art. Attempts have been made in the past to address this problem by providing circuitry such as electronic control units for charging only the cells of the battery which have not reached their fully charged state. However, such circuitry is complex, expensive and cumbersome. It is therefore desirable to develop an apparatus and mechanism whereby the plurality of cells of the battery may be fully charged without exposing the battery to permanent damage.

Various lithium batteries with improved overcharge capacity have been proposed. For example, U.S. Pat. No. 4,324,846 suggests such a battery with a negative electrode which has additional capacity at an increased lithium activity. This results in a cell having an overcharge characteristic in which the voltage level of the cell rises, during charging, steeply from about 1.5 volts to 1.8 volts; however, a constant voltage output is not available. A tradeoff is, therefore, necessary between the magnitude of the voltage discontinuity and the amount of available overcharge protection.

Another approach protects fully charged cells from permanent damage while permitting the remaining uncharged cells to become fully charged. As described more fully in U.S. Pat. No. 4,851,306, issued on Jul. 25, 1989 and incorporated herein in its entirety by reference, a small amount of nickel or cobalt can be substituted for part of the lithium-aluminum iron component of a two-phase lithium-alloy electrode. Such a substitution is found to regulate the solubility of the lithium in the LiCl—LiBr—KBr electrolyte and give rise to an induced self-discharge current in the fully charged cells sufficient to permit the continuation of a trickle charge of about two milliamperes per square centimeter (mA/cm$^2$) on the battery. The trickle charge continuation then permits all of the cells in the battery to become fully charged over time. While such an approach has shown some utility, it remains a problem that the trickle charge rate can be no more than the self-discharge rate, so as to not damage the fully charged cells while many times weaker cells require a higher trickle charge rate to gain capacity.

SUMMARY OF THE INVENTION

Figure 1:
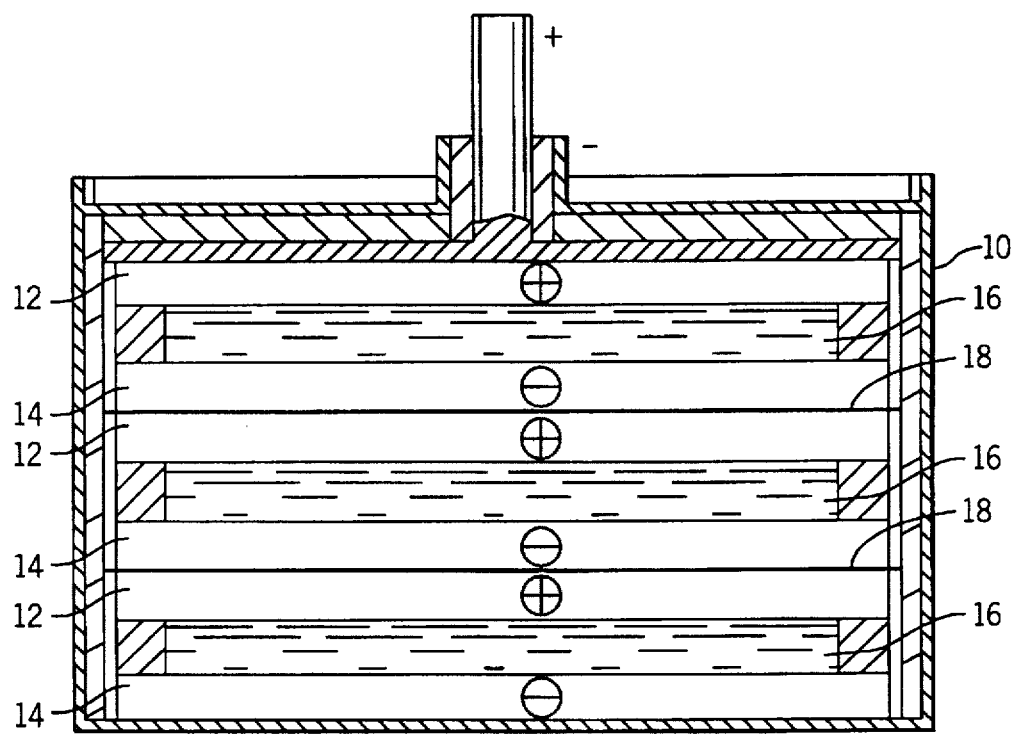
FIG. 1 is a schematic illustration of a lithium alloy battery having a plurality of cells.

The prior art has associated with it a number of significant problems and deficiencies, most of which relate to limitations on the self-discharge rate of a fully charged cell and result from insufficient lithium solubility. There is a need for a method of improving overcharge tolerance, and lithium batteries for use in conjunction therewith, overcoming the limitations of the prior art and including those mentioned above.

Accordingly, it is an object of the present invention to provide a lithium battery and/or a series of cells having enhanced overcharge tolerance and increased power and method(s) for accomplishing the same. It can also be an object of the present invention to provide a battery and/or a series of cells having enhanced overcharge tolerance, allowing for a greater range of cell variation and, thereby, increasing charge-discharge cycle life. Associated therewith, it can also be an object of the present invention to produce batteries commercially in a more cost-efficient manner by permitting a greater degree of variation, cell-to-cell, without compromising battery performance.

It can also be an object of the present invention to provide an enhanced lithium shuttle mechanism rate, such that there is a substantial reduction in time necessary to bring a multi-cell battery to full charge.

It can also be an object of the present invention to improve battery performance, via an improved rate of cell capacity equalization without destructive overcharging.

It will be understood by those skilled in the art that one or more aspects of this invention can meet certain objectives, while one or more other aspects can meet certain other objectives. Each objective may not apply equally, in all instances, to every aspect of the present invention. As such, the following objects can be viewed in the alternative with respect to any one aspect of this invention.

Other objects, features and advantages of the present invention will be apparent from the following and/or descriptions of various preferred embodiments, and will be readily apparent to those skilled in the art having knowledge of high-temperature, bipolar lithium batteries, their construction and operation. Such objects, features, benefits and advantages will be apparent from the above as taken in conjunction with the accompanying examples, tables, data and all reasonable inferences to be dram therefrom.

In part, the present invention is a lithium battery, including (1) a plurality of cells, each cell having a positive electrode of either FeS or $FeS_2$ and a negative electrode of lithium alloy phases; (2) a plurality of separators between the positive and negative electrodes; and (3) an electrolytic mixture of lithium chloride, lithium bromide, and potassium bromide, modified with lithium iodide in an amount sufficient to increase lithium solubility in the mixture. Suitable alloys and alloy combinations include those provided in Example 6, below. With respect to the positive electrodes, additives such as $NiS_2$, $CoS_2$, $CuFeS_2$ and other similar materials known to those skilled in the art can be used to improve the electronic conductivity of the electrodes. For example, $CoS_2$ can be used at a concentration of about 15 mole percent with good effect.

The electrolytic mixture is liquid under about 400°–440° C. Preferably, the molar ratio of lithium chloride to lithium bromide to potassium bromide is about 34:33:33 and/or the lithium iodide is present at a concentration of about 2.0 to about 10.0 mole percent, with reference to the electrolytic mixture. In highly preferred embodiments, the concentration of lithium iodide is about 5.0 mole percent. Alternatively, the mixture is eutectic with a molar ratio of lithium chloride to lithium bromide to potassium bromide is about 25:38:37 and/or the lithium iodide is present at a concentration of about 2.0 to about 10.0 mole percent.

Alternatively, notwithstanding the molar ratio of the electrolytic mixture, the amount of lithium iodide present is sufficient to provide an extended period of trickle charge current of about 4.0 to about 5.0 mA/cm$^2$ near full charge. Optionally, where the amount of lithium iodide is sufficient to provide such a trickle charge, the electrolytic mixture can further include lithium fluoride in an amount solubilized by the mixture such that cell capacity utilization is further increased at high discharge rates.

Irrespective of the precise amount of lithium iodide and/or the presence of lithium fluoride, the cells of the lithium battery can be constructed in such a way that the modified electrolyte is present in the separator and diffuses thereafter to change the electrolyte composition of the entire cell.

Inasmuch as lithium iodide is somewhat hygroscopic, this approach may be utilized to reduce various handling concerns during battery/cell assembly.

In highly preferred embodiments, the modified electrolyte of this invention is used in construction of the electrodes and the cell separators. In alternate embodiments, during cell construction, powdered lithium iodide can be placed (a) between the electrodes and at least one separator, (b) at the back of the electrode plates, and (c) using a combination of (a) and (b).

In yet another embodiment of this invention, a cell and/or battery can be constructed by placing a pill, brick or unitized amount of lithium iodide in a void area of the cell and/or battery. Such placement would minimize water absorption by the lithium iodide. Such a unit could be wrapped and/or contained with an aluminum foil, with the aluminum reacting with the lithium in the cell to expose the lithium iodide to the molten electrolyte. Containing the lithium iodide in this manner can also serve to minimize water absorption.

In part, the present invention is a method of simultaneously improving overcharge tolerance for and increasing the power of a lithium battery having a plurality of cells—each cell having a positive electrode and a negative electrode as described above, a plurality of separators between the positive and negative electrodes, and an electrolytic mixture of lithium chloride, lithium bromide and potassium bromide—including the modification of the electrolyte mixture with lithium iodide in an amount sufficient to increase lithium solubility in the electrolyte mixture. In preferred embodiments, the lithium iodide is present at a concentration of about 2.0 to about 10.0 mole percent and/or lithium fluoride is solubilized in a eutectic electrolyte mixture in an amount sufficient to increase cell capacity utilization. In highly preferred embodiments, the concentration of lithium iodide, whether or not lithium fluoride is present, is about 5.0 mole percent. Regardless, the electrolyte mixture can be modified as described above in conjunction with the lithium battery of this invention, including but not limited to the introduction of lithium iodide between the electrodes and at least one separator.

In part, the present invention is a method of producing a lithium battery having improved resistance to destructive overcharging. The method includes (1) providing a plurality of serially connected cells, with each cell having a positive electrode of either FeS or $FeS_2$ and a negative electrode of lithium alloy phases; (2) providing a plurality of separators between the positive and negative electrodes; (3) placing an electrolyte mixture of lithium chloride, lithium bromide and potassium bromide within the separators; and (4) modifying the electrolyte mixture with an amount of lithium iodide sufficient to increase the self-discharge rate of a fully charged cell. Electrode materials can include those described herein. In preferred embodiments, the lithium iodide is present at a concentration of about 5.0 mole percent and/or includes solubilizing an amount of lithium fluoride in the electrolyte in an amount sufficient to increase cell capacity utilization. In preferred embodiments, the lithium iodide can be introduced to the battery between the electrodes and at least one of the separators, or a modified electrolyte mixture can be introduced to at least one of the separators.

With reference to FIG. 1, a lithium battery is schematically shown as having case 10, a plurality of positive electrodes 12 and a plurality of negative electrodes 14, each pair of positive and negative electrodes with intervening electrolyte matrix layer forming a cell. Adjacent cells can be separated by conductive sheets 18. Separators 16 are between the electrodes of each cell and include an electrolyte, as described above. Terminals 20 supply power from the battery to an external electrical circuit.

It will be understood that one skilled in the art can construct the cells/battery of FIG. 1 with a variety of materials. However, in preferred embodiments, the battery has alkali-metal conductivity and is constructed as described more fully in U.S. Pat. No. 5,162,172, issued Nov. 10, 1992, using materials described both therein and in U.S. Pat. No. 5,194,298, particularly Tables I and II thereof and as described in col. 2–7, issued Mar. 16, 1993, both of which are incorporated by reference in their entirety. In highly preferred embodiments—an electrochemical cell or a bipolar battery having a plurality of such cells—negative electrode 14 is a lithium alloy, generally LiAl or LiSi, and positive electrode 12 is an iron sulfide, $FeS_2$ or FeS, with an additive such as $CoS_2$ or $CuFeS_2$. Likewise, in accordance with this invention and as described above, a preferred electrolyte is a lithium chloride-lithium bromide-potassium bromide mixture.

The battery in FIG. 1 has a total voltage proportional to the number of cells it contains, since all are connected in series. When a charging current is supplied to such a battery, the current runs in series through each of the cells, with the result that the charging current in each cell is identical. The effect of the charging current is to support an electrochemical reaction in which lithium-aluminum is formed from the reduction of lithium ions as the voltage exhibited across the cell increases during charging.

Each cell of the battery of FIG. 1 has a self-discharge current due to cell imperfections. There is a second self-discharge mechanism, which rises during the charging operation as lithium-aluminum or other lithium alloys such as LiSi, LiAlSi and LiAlFe, accept additional lithium. This second induced self-discharge current is the result of a reversible chemical reaction and will not damage the cell, as would be occasioned by an irreversible deposit of conductive constituents. The irreversible reaction is characterized by:

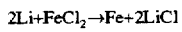

$$2Li + FeCl_2 \rightarrow Fe + 2LiCl$$

The dominant self-discharge mechanism is believed to depend upon a rate controlled by the activity of the Li-alloy electrode. Without restriction to any one theory or mode of operation, a proposed "lithium shuttle" mechanism (LSM) would involve dissolution of $Li^0$ (probably to form $Li_2^+$ or $LiK^+$) at the Li-alloy electrode surface, diffusion of the $Li^0$ across the electrolyte/separator to the positive electrode and electrochemical discharge of the $Li^0$ to produce $Li^+$ at the positive electrode. However, available information indicates that an LSM can describe the observed self-discharge. An LSM would also explain >99% coulombic efficiencies in the normal operation as well as the much greater steady-state self-discharge rates attained for overcharge tolerance.

An electrolyte battery modification, as accomplished in accordance with this invention, provides a significantly increased rate of LSM as can be determined with 25 Ah bipolar $Li/FeS_2$ cells at 425° C. This modification to an LiCl—rich LiCl—LiBr—KBr electrolyte, for example and as described above, shows LSM rates of about 4.0 mA/cm² compared to the typical 2.0 to 2.5 mA/cm² rates—an increase of at least about 50%.

A higher LSM rate leads to more rapid cell equalization. The underlying cell self-discharge rate 0.1–0.3 mA/cm² is little changed. Consequently, a trickle charge of about 4.0 to about 5.0 mA/cm² can be applied to the whole bipolar battery for cell equalization. The utility and added benefit is illustrated for state-of-the-art cells, where the standard LSM rate of 2.0 to 2.5 mA/cm² could be overwhelmed by cells having minor separator faults. The enhanced LSM rate will relax cell matching requirements—such that greater deviations in separator properties, for example, can be tolerated.

Contrary to conventional understanding and the prior art, LSM rates appear to be regulated by lithium solubility in the molten-salt electrolyte. Both galvanic (trickle charge rates) and coulometric (10% overcharge capacity) investigation of LSM at $\leq -200$ mV vs. LiAl reference demonstrated 4.0–5.0 mA/cm² LSM rates at 425° C. with the modified electrolyte of this invention. As mentioned above, the LSM rate without the modification is consistently measured at 2.0–2.5 mA/cm² for all test cells.

When the cell operates in the overcharge region, the self-discharge rate increases to equal the trickle-charging current, with the result that there is no added charge capacity on the cell once the overcharging region is reached. Meanwhile, other cells which are serially connected in the battery of FIG. 1 can continue to charge to capacity until each of them is fully charged, without bringing about any permanent damage to the battery. Battery reliability is improved through a combination of overcharge tolerance for each cell and the ability to charge/equalize battery cells in the bipolar stack by trickle charging at a higher rate than previously available. The capability for increased trickle charge rate can be provided, with the ability to accommodate greater cell-to-cell deviations in a bipolar stack.

As discussed above, the battery of FIG. 1 incorporates a separator 16 in each cell, which separates the positive and negative electrodes. Each separator or electrolyte matrix can be formed using porous or sponge-like materials, from MgO, AlN or $Al_2O_3$ powders and the like. Bipolar cells constructed with high-surface-area separators and metal/ceramic peripheral seals have demonstrated life times over 300 cycles. The typical peripheral seal consists of two molybdenum rings bonded together with sulfide ceramics. An alternative seal design, which uses only one piece of molybdenum per cell, also shows long-term stability. In this steel ring/molybdenum cup/steel ring seal arrangement, the stack is assembled by a simple steel intercell peripheral weld.

Separators 16 are typically about 0.2 mm to 2.0 mm thick, and have a porosity of 50% to 90%. Such separators function to allow a rapid rate of lithium diffusion, but still provide physical and mechanical stability. Preferably, they are of two layer construction, with magnesium oxide on the negative side and a boron nitride mat material on the positive side.

The separator/electrolyte matrix can be formed in a variety of ways. For example, it can be formed by melting an electrolyte of this invention with MgO particles, which are then cold pressed into the required shape. Alternatively and with subsequent electrolyte incorporation, a high temperature slurry of MgO particles can be drawn out into sheet form and allowed to solidify. In yet another variation, the MgO particles may be mixed and slurried with an organic binder such as kerosene, toluene or petroleum ether.

Improved performance is often at odds with high discharge rates. Quite unexpectedly, however, an electrolyte used in conjunction with this invention has been found to significantly improve cell performance and enhance overcharge tolerance. Addition of lithium fluoride, as described above, provides improved performance, but also meets several other requirements. The lithium-ion content is raised without raising the electrolyte liquidus temperature; the liquidus range of the lithium-ion content at 425° C. is not diminished; and the relatively lower ionic conductivity of lithium iodide is minimized. For the most part, the LiF remains as a separate solid phase in molten LiCl—LiBr—KBr (as indicated by differential thermal analysis). The liquidus point and the liquidus range of lithium-ion content are largely unaffected. Only about 1 mol % LiF solubilizes, as supported by the LiF—LiBr—KBr phase diagram. As shown in the examples which follow, a combination of LiI and LiF, in accordance with this invention, increases cell capacity utilization at high discharge rates (e.g., 80 mA/cm$^2$) by 20%.

Figure 2:
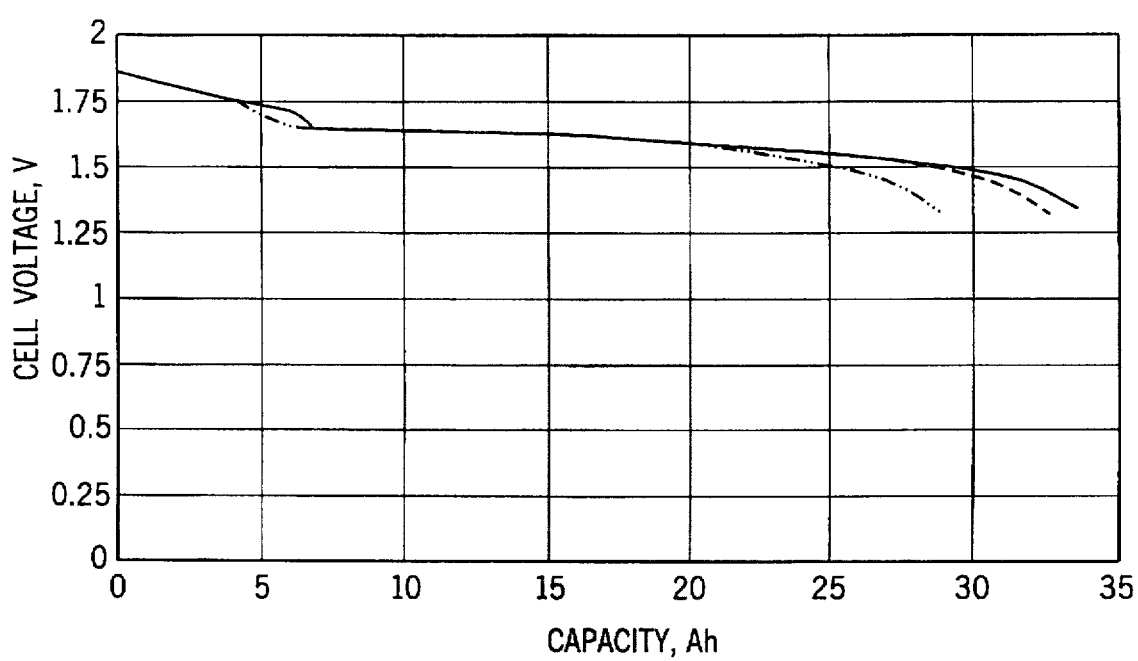
FIG. 2 shows graphically improved cell capacity using an electrolyte modified in accordance with this invention (_._._, 34:33:33 Li Cl—LiBr—KBr;—with 5.0 mol % LiI; and—with 5.0 mol % LiI, 1.0 mol % LiF)

Tests with full-sized bipolar cells were conducted to evaluate performance improvement relative to the present electrolyte modifications. A progressive improvement in achieved specific energy is indicated. Three cells were operated with the same FeS$_2$—15 mol % CoS$_2$ positive electrode of 40 Ah theoretical capacity but different electrolytes. With reference to FIG. 2, two additives (5.0 mol % LiI and 1.0 mol % LiF) increased cell specific energy at the C/3 rate by 13%, to 189 Wh/kg. Also, the cell capacity was increased from approximately 28 Ah to approximately 34 Ah at 75 mA/cm$^2$ discharge current density.

Figure 3:
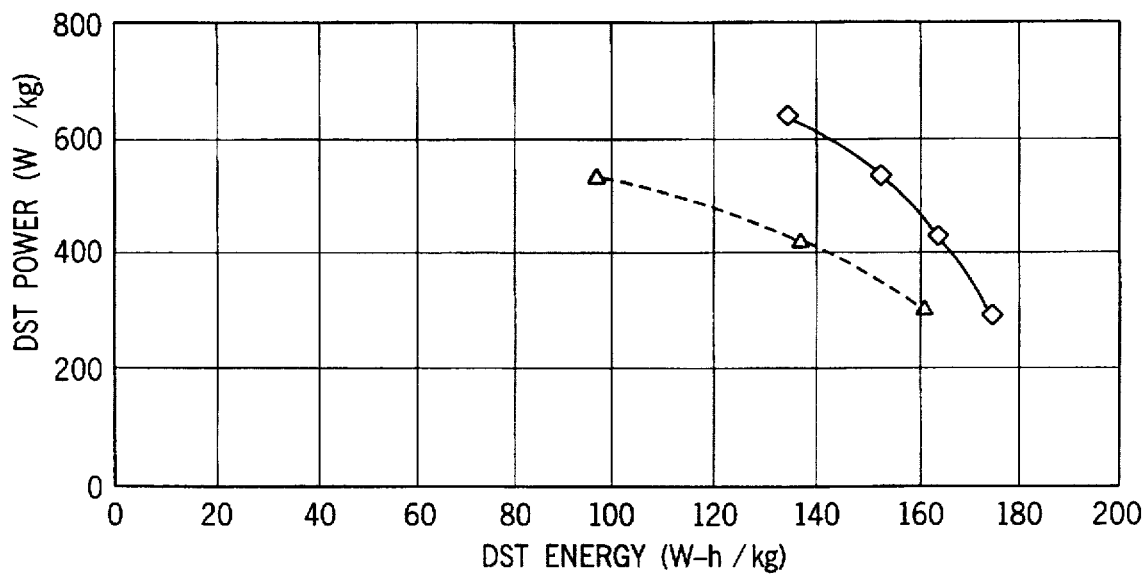
FIG. 3 is a Ragone-type plot of DST (EV driving profile test) performance, using cells with FeS$_2$—CuFeS$_2$ (15 mol %) positive electrodes, standard salt/MgO powder separators, 5.0 mol % LiI in a 34:33:33 LiCl—LiBr—KBr electrolyte, at a cell temperature of 440° C. (◊ BID 286 with LiI and Δ BID 281 without LiI)

The ultimate evaluation of the electrolyte modification is the cell power capability. Simulated electric-vehicle driving profiles are generally used for performance assessment. By testing a cell under a series of driving profiles having increased power demand, a Ragone-type plot was generated. As shown in FIG. 3, an electrolyte modification (5 mol % LiI) of the sort consistent with this invention together with a FeS$_2$—15 mol % CuFeS$_2$ positive electrode provided a near 50% increased power performance at test profiles that achieved similar net specific energy. For example, at 140 Wh/kg, the modified-electrolyte cell supported 600 W/kg power pulse (8-s duration), in comparison to only 400 W/kg for the standard-electrolyte cell.

EXAMPLES OF THE INVENTION

The following non-limiting examples and data, in conjunction with the referenced figures, illustrate various aspects and features relating to the battery articles and methods of this invention, including the surprising and unexpected effect of the present modified electrolytes on power capability, overcharge tolerance and/or cell capacity utilization. While the cell(s) and batteries of the following examples were constructed such that the modified electrolyte was introduced to the separator (cell) or between the electrodes and a separator (battery), construction and/or electrolyte modification can otherwise be accomplished as disclosed herein. Likewise, comparable effect and utility can be achieved using other of the various electrolyte modifications disclosed herein, in conjunction with other cell, battery and/or electrode assemblies—as would be known to those skilled in the art.

Example 1

The lithium shuttle mechanism rate for overcharge tolerance for a BID 197 overcharge tolerance cell with both additives, LiF and LiI, was determined to be 5 mA/cm$^2$ at 440° C. Two cycles were compared: one charge to a voltage cutoff, the other followed by a 1.0 A trickle charge. A 2.5 Ah overcharge capacity over 4 h translates into a 5 mA/cm$^2$ trickle charge tolerance rate. An underlying self discharge rate of 0.3 mA/cm$^2$ is taken into account.

Example 2

With the battery of Example 1, trickle charges were measured at 0.4 to 0.8 A rates and indicated 0.6 A (or 5 mA/cm$^2$) to be the overcharge tolerance (OCT) rate for the cell. This rate closely approximates the OCT rates of the LiI additive alone. The level of LiF in the molten electrolyte is less than 1 wt %: while enhanced, FeS$_2$ electrode performance is a result of solid LiF (4 wt %) remaining in the FeS$_2$ electrode. Cell voltages remained stable (i.e., balanced to self-discharge rates) during 0.6 A trickle charge. Nonetheless, the enhanced cell performance of 20% increased cell capacity can be obtained without compromising the OCT rates. Thus, LiI addition to enhancing OCT rates was found to overcome the effect of LiF in suppressing OCT rates.

Example 3

The bipolar battery of this example demonstrated performance commensurate with high rate discharge and power pulse applications. It consists of a stack of sealed cells (13-cm diameter×0.7-cm thick). A combination of electrolyte modifications and active material refinements, in accordance with this invention, effectively doubled capacity at the C/1 rate and also under a 544 W/kg power pulse (8-second) schedule. The cell capacity under the high-power-pulse demand approximated the C/3 rate discharge capacity. Cell specific energy is 155 Wh/kg at the C/3 rate.

Example 4

Figure 4:
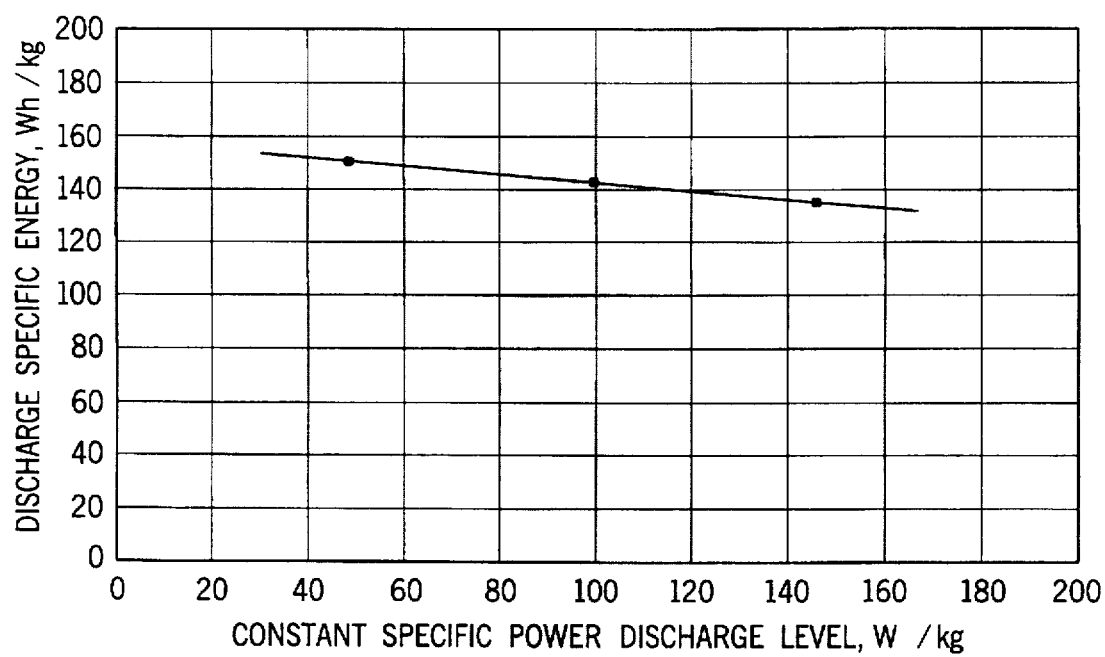
FIG. 4 is a Ragone-type plot of a bipolar LiAl/FeS$_2$ cell (0.275 kg) at 440° C., using a FeS$_2$—CuFeS$_2$ positive electrode and 5.0 mol % LiI.

A typical-25 Ah bipolar cell of this example has a weight of 0.275 kg (including hardware required for assembly of a sealed bipolar stack). A Puekert test revealed stable capacity as discharge current density is increased. Capacity decreased by less than 1% from the C/3 to the C/1 discharge rate, while the energy decreased by 7% due to IR drop. The C/3 rate (8.5 A discharge rate, 75 mA/cm$^2$) provided 42.5 Wh, while the C/1 (200 mA/cm$^2$) rate provided 39.5 Wh. A Ragone Plot (see, FIG. 4) for cell performance indicates a specific power of 544 W/kg (8-s pulse) and a specific energy of 114 Wh/kg. These values are achieved with routine regenerative pulses as great as 270 W/kg (8-s pulse). The bipolar design also provides significant design flexibility. The battery power-to-energy ratio can be tailored to a specific application by altering cell capacity (e.g., electrode thickness). The high rate discharge capability (>100 mA/cm$^2$) significantly increases the specific energy for low C rate discharge. That is, the discharge current density increases proportionally to the increased cell capacity (electrode thickness) for a given C rate. The range of applications for the sealed bipolar Li/FeS$_2$ battery is quite broad and includes pulse power for electric vehicle propulsion, high specific power for aerospace systems, and high specific energy to power monitoring systems.

Example 5

Figure 5:
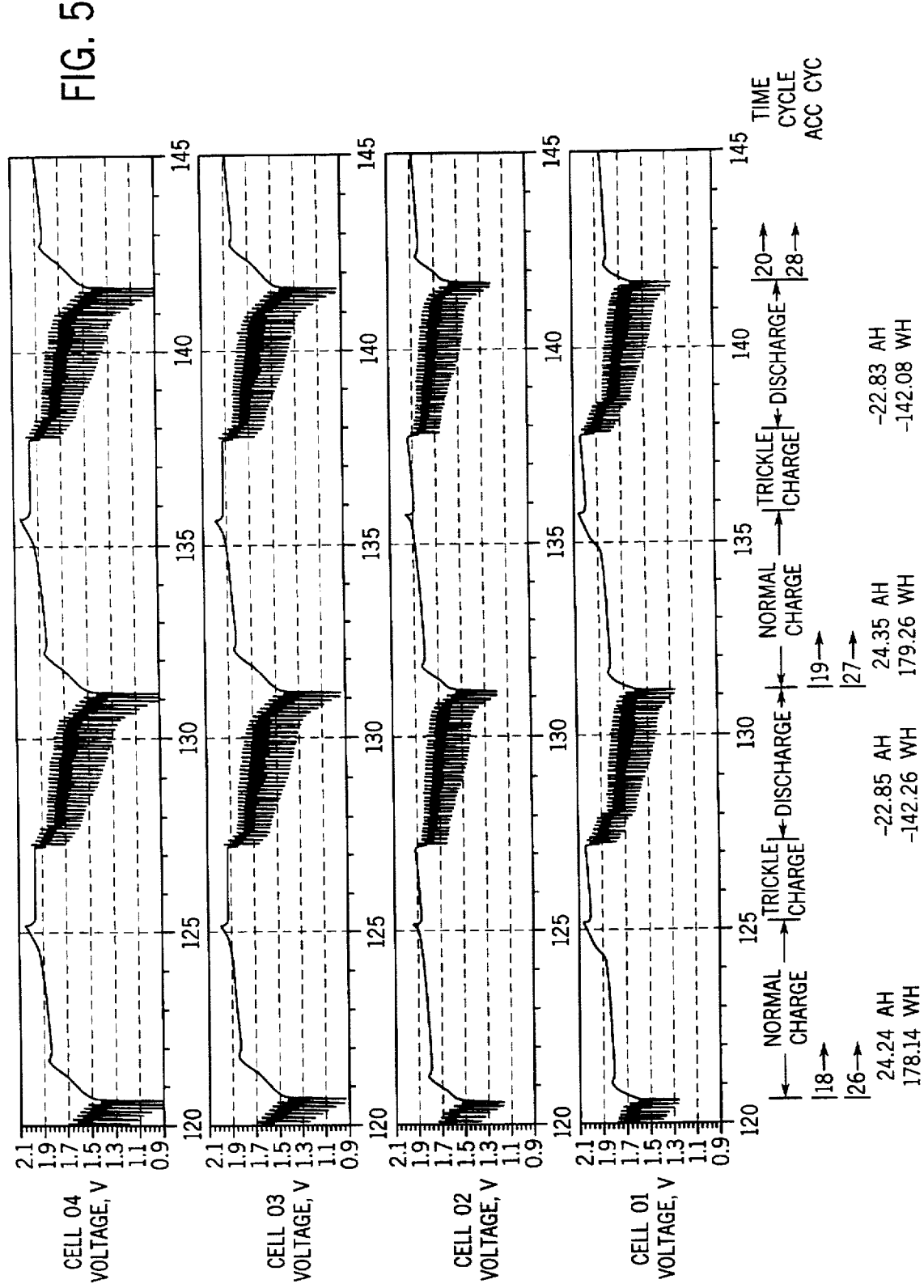
FIG. 5 compares cells 01–04 of a four-cell battery in terms of cell voltage over the time of several charge-discharge cycles. The battery, 5-inch/stack, was assembled in accordance with this invention, using a FeS$_2$—CuFeS$_2$ positive electrode, a standard MgS separator, and 5.0 mol % LiI in a 34:33:33 LiCl—LiBr—KBr electrolyte.

As described more fully above, an enhanced LSM rate (up to about 5.0 mA/cm$^2$) promotes more rapid cell equalization. Reference is made to FIG. 5, showing a plot of cell voltage versus time for cells 01–04 of a four-cell battery. Note, in particular, that weaker cell 02 has increased voltage during trickle-charge periods (at 125–127 h and at 135.7–137.7 h) while the other cells maintain safe voltage levels. As a result, overall battery performance is enhanced, after trickle-charge periods, without damage to or compromising the structural/electrical integrity of the stronger cells.

Example 6

This example provides a representative listing of lithium alloys and/or lithium alloy combinations suitable for use with and/or in the formation of electrodes for an overcharge tolerant cell or series of cells, i.e., exhibiting an about-150 to about-250 mV step in potential near full charge capacity:

| | |
|---|---|
| a) | Li—Al + Li—Al$_5$Fe$_2$ |
| b) | Li—Al + Li—Al$_5$Fe$_{1.8}$Ni$_{0.2}$ |
| c) | Li—Al + Li—CaSi$_2$ |
| d) | Li—Al + Li—Si |
| e) | Li—Si$_{1.3}$Ni |

Further reference is made to U.S. Pat. No. 4,851,306, in particular to columns 3–4, for other alloys and/or combinations, considerations and parameters use in the formation of overcharge tolerant cell(s).

While the principles of this invention have been described in connection with specific embodiments, it should be understood clearly that these descriptions along with the chosen figures, charts and data therein, are made only by way of example and are not intended to limit the scope of this invention, in any manner. For example, data is presented from tests utilizing preferred lithium iodide and/or lithium fluoride concentrations in conjunction with preferred battery embodiments. However, and as would be well known to those skilled in the art made aware of this invention, various other electrolyte modifications and battery/cell embodiments can be employed, consistent with this invention, to achieve comparable, beneficial effects. Other advantages and features of this invention will become apparent from the following claims, with the scope thereof determined by the reasonable equivalents, as understood by those skilled in the art.

What is claimed is:

1. A lithium battery, comprising:
   a plurality of cells, each said cell with a positive electrode formed of either FeS or FeS$_2$, and a negative electrode formed of lithium alloy phases;
   a plurality of separators between said positive and negative electrodes; and
   an electrolytic mixture of lithium chloride, lithium bromide, and potassium bromide, said electrolytic mixture modified with lithium iodide in an amount sufficient to increase lithium solubility in said mixture.

2. The battery of claim 1 in which said mixture is liquid under about 400° C.

3. The battery of claim 2 wherein the molar ratio of lithium chloride to lithium bromide to potassium bromide is about 34:33:33.

4. The battery of claim 3 wherein said lithium iodide is present at a concentration of about 2.0 to about 10.0 mol %, said concentration as compared to said electrolytic mixture.

5. The battery of claim 4 wherein said concentration is about 5.0 mole percent.

6. The battery of claim 2 wherein the molar ratio of lithium chloride to lithium bromide to potassium bromide is about 25:38:37.

7. The battery of claim 6 wherein said lithium iodide is present at a concentration of about 2.0 to about 10.0 mole percent, said concentration as compared to said electrolytic mixture.

8. The battery of claim 1 wherein said electrolytic mixture is present within said separators.

9. The battery of claim 8 wherein said lithium iodide and said electrolytic mixture are within said separators.

10. The battery of claim 1 wherein said lithium iodide is initially placed between said electrodes and at least one of said separators.

11. The battery of claim 1 wherein said lithium iodide is contained within aluminum and exposable to said electrolytic mixture.

12. The battery of claim 1 wherein said amount of lithium iodide is sufficient to provide an extended period of trickle charge current of about 4.0 to about 5.0 mA/cm$^2$ near full charge.

13. The battery of claim 1 wherein said electrolytic mixture further includes lithium fluoride in an amount solubilized by said mixture.

14. The battery of claim 13 wherein said amount of lithium fluoride is about 1.0 mole percent and said amount of lithium iodide is sufficient to provide an extended period of trickle charge current of about 4.0 to about 5.0 mA/cm$^2$ near full charge.

15. A method of improving overcharge tolerance for and increasing the power of a lithium battery having a plurality of cells, each cell with a positive electrode formed from either FeS or FeS$_2$, and a negative electrode formed of lithium alloy phases, a plurality of separators between the positive and negative electrodes, and an electrolyte formed from a mixture of lithium chloride, lithium bromide and potassium bromide, said method comprising modifying the electrolyte mixture with lithium iodide in an amount sufficient to increase lithium solubility in the electrolyte mixture.

16. The method of claim 15 wherein said lithium iodide is present at a concentration of about 2.0 to about 10.0 mole percent.

17. The method of claim 16 wherein said concentration is about 5.0 mole percent.

18. The method of claim 15 wherein the electrolyte mixture is modified by introducing lithium iodide between the electrodes and at least one separator.

19. The method of claim 15 further including solubilizing lithium fluoride in the electrolyte in an amount sufficient to increase cell capacity utilization.

20. A method of producing a lithium battery having improved resistance to destructive overcharging, said method comprising:
   providing a plurality of serially connected cells, each said cell with a positive electrode formed of either FeS or FeS$_2$, and a negative electrode formed of lithium alloy phases;
   providing a plurality of separators between said positive and negative electrodes;
   placing an electrolyte mixture of lithium chloride, lithium bromide and potassium bromide within said separators; and
   modifying said electrolyte mixture with an amount of lithium iodide sufficient to increase the self-discharge rate of a fully charged cell.

21. The method of claim 20 wherein said lithium iodide is present at a concentration of about 5.0 mole percent.

22. The method of claim 20 wherein said lithium iodide is introduced to the battery between the electrodes and at least one of said separators.

23. The method of claim 20 wherein said modified electrolyte mixture is introduced to at least one of said separators.

24. The method of claim 20 further including solubilizing an amount of lithium fluoride in said electrolyte mixture sufficient to increase cell capacity utilization.

* * * * *

UNITES STATES PATENT AND TRADEMARK OFFICE
CERTIFICATE OF CORRECTION

PATENT NO.    : 5,736,275

DATED         : April 7, 1998

INVENTOR(S)   : Thomas D. Kaun

It is certified that error appears in the above-identified patent and that said Letters Patent is hereby corrected as shown below:

In Column 3, line 27, delete "dram" and insert --drawn--.
In Column 6, line 40, delete "tings" and insert --rings--.
In Column 6, line 43, delete "ting" and insert --ring--.

Signed and Sealed this

Eighteenth Day of August, 1998

Attest:

BRUCE LEHMAN

Attesting Officer

Commissioner of Patents and Trademarks